United States Patent [19]

Sato et al.

[11] Patent Number: 5,020,685
[45] Date of Patent: Jun. 4, 1991

[54] FILLER NECK CAP WITH PRESSURE VALVE

[75] Inventors: Kyokuichi Sato; Tooru Kayatani; Toru Kenmotsu, all of Okayama, Japan

[73] Assignee: O M Industrial Co., Ltd., Okayama, Japan

[21] Appl. No.: 468,639

[22] Filed: Jan. 23, 1990

[30] Foreign Application Priority Data

Sep. 6, 1989 [JP] Japan .................. 1-231993

[51] Int. Cl.⁵ .......................................... B65D 51/16
[52] U.S. Cl. .................................. 220/203; 220/303; 220/DIG. 33
[58] Field of Search ............... 220/202, 203, 204, 303, 220/DIG. 33

[56] References Cited

U.S. PATENT DOCUMENTS

| | | | |
|---|---|---|---|
| 3,724,707 | 4/1973 | Burgess . | |
| 3,985,260 | 10/1976 | Evans | 220/203 |
| 4,000,828 | 1/1977 | Crute et al. | 220/203 |
| 4,091,955 | 5/1978 | Sloan, Sr. | 220/203 |
| 4,162,021 | 7/1979 | Crute | 220/202 |
| 4,676,390 | 6/1987 | Harris | 220/203 |
| 4,716,920 | 1/1988 | Crute | 137/39 |
| 4,795,053 | 1/1989 | Kasugai et al. | 220/203 |

Primary Examiner—Stephen P. Garbe
Assistant Examiner—Nova Stucker
Attorney, Agent, or Firm—Koda and Androlia

[57] ABSTRACT

In a plastic filler neck cap including therein a receptacle for a pressure control valve and a receptacle for an anti-leakage assembly, a positive-negative pressure valve is compactly constructed in such a manner that the valve body retainer plate is formed into a hat-like configuration including an upper portion with a passing hole at its center, an outer peripheral wall and a spring reception tongue; the valve body is in engagement with the valve body retainer plate whose passing hole sustains a portion of the valve body; the valve body presents a double-disk shape with a smaller upper disk and a larger lower disk having on the upside a peripheral upper ridge and on the downside a lower ridge inside the upper ridge, and further a center communication opening extending through both the disks; the diameter of the negative pressure valve body is predetermined larger than the extension of the lower ridge on the bottom of the valve body, forming a pan-like shape setting the opening side down with a skirt portion extending downwardly at the periphery; and the negative valve body is accommodated in a valve body reception circular casing extending upwardly from the separation plate of the inner cap, while being compressed at the upper face thereof against the lower ridge of the valve body by means of an inner coil spring.

4 Claims, 5 Drawing Sheets

FILLER NECK CAP WITH PRESSURE VALVE

BACKGROUND OF THE INVENTION

1. Industrial Field of the Invention

The present invention relates to a filler neck cap of a fuel tank for automobiles or the like and, more particularly, to a safety plastic filler neck cap containing positive-negative pressure valves or a positive pressure valve therein.

2. Description of the Prior Art

As conventional positive-negative pressure valves or a positive pressure valve contained in a filler neck cap, there have been proposed various kinds of caps having different configurations for assembling valve components in narrow spaces to compact the sizes of the caps and ensure smooth operations of the valves, for example, as disclosed in U.S. Pat No. 3,724,707, U.S. Pat No. 4,091,955, U.S. Pat. No. 4,162,021, U.S. Pat. No. 4,676,390, and U.S. Pat. No. 4,716,920.

The inventor of the present application has previously developed such filler neck caps as shown in FIGS. 6 and 7 as a result of investigation in various ways, for the purpose of achieving the above objects to assemble the valve components in the narrow spaces and to obtain the smooth operations of the valves. FIGS. 6 and 7 are vertical cross-sectional views of the filler neck caps of the positive-negative pressure valve type and of the positive pressure valve type in the prior art. The valve employed in each conventional filler neck cap illustrated in FIGS. 6 and 7 is arranged in such a manner that a partition or separation plate 11 within an inner cap 2 of the filler neck cap operates as a valve seat and a valve body 6 is compressed against the separation plate by means of a coil spring 4 so that the valve body may contact to overlap the separation plate.

In the above case, if the valve body or a valve body retainer plate 5 is formed into a configuration of a plate-like member, the space for accommodation of the plate-like members has to be enlarged. In addition, when the plate-like valve body is brought into contact with the valve body retainer plate without a gap therebetween, a disadvantage appears such that a sealing effect of the valve body at low pressure is deteriorated. Further, even if the valve body and the valve body retainer plate are so improved as to produce a space therebetween, the valve body sticks to the valve body retainer plate on the negative pressure side, which also results in a deterioration of the sealing effect of the valve body. It has clearly be seen that the relation between the valve body and the valve body retainer plate in the narrow space and the difference in the constructions thereof delicately affect on the sealing effect of the valve body.

In order to provide a mechanical strength for the valve body and accommodate the valve body in the restricted space, the valve body retainer plate has been formed into a hat-like shape, and the valve body has been similarly into a pan-like configuration setting the opening side down, for being contained within the hat-like valve body retainer plate. However, a problem to be solved was found in that, when strong flow of gas was created at the time of opening the valve body, a violent vibration was produced, thereby causing the unstable flow rate of the gas as well as a granting noise of the filler neck cap.

SUMMARY OF THE INVENTION

For the purpose of solving the above-described problems, the present invention provides an improved safety plastic filler neck cap containing stable positive-negative pressure valves in a narrow space and including a function to prevent fuel leakage. The constructional characteristics of the filler neck cap will be described below.

The filler neck cap including an outer cap and an inner cap, the inner cap being provided with a screw portion on its outer periphery and with a partition or separation plate with a communication hole at the intermediate portion therewithin to separate the interior of the inner cap into an upper and lower spaces, of which upper space serves as a receptacle for a pressure control valve and of which lower space serves as a receptacle for an anti-leakage assembly, is arranged in such a manner that, in case of the positive-negative pressure valve type whose pressure control valve comprises a valve body, a valve body retainer plate and a negative pressure valve body, the valve body retainer plate is formed into a hat-like configuration including an upper portion with a passing hole at its center, an outer peripheral wall and a spring reception tongue; the valve body is in engagement with the valve body retainer plate whose passing hole sustains a portion of the valve body; the valve body presents a double-disk shape with a smaller upper disk and a larger lower disk having on the upside a peripheral upper ridge and on the downside a lower ridge inside the upper ridge, and further a center communication opening extending through both the disks; the diameter of the negative pressure valve body is predetermined larger than the extension of the lower ridge on the bottom of the valve body, forming a pan-like shape setting the opening side down and including a skirt portion extending downwardly at the periphery; and the negative pressure valve body is accommodated in a valve body reception circular casing extending upwardly from the separation plate of the inner cap, while compressed at the upper face thereof against the lower ridge of the valve body by means of an inner coil spring.

In the next, a case utilizing only a positive pressure valve whose pressure control valve comprises a valve body retainer plate and a valve body, will be described hereinafter. In this case, the valve body retainer plate is formed into a hat-like configuration having an upper portion with a passing hole at its center, an outer peripheral wall and a spring reception tongue. The valve body is in engagement with the valve body retainer plate whose passing hole sustains a portion of the valve body. The valve body presents a double-disk shape with a smaller upper disk and a larger lower having on the upside a peripheral upper ridge and on the downside a lower ridge inside the upper ridge, and further a center communication opening extending through both the disks.

The valve body retainer plate is provided with wall holes having predetermined spaced intervals therebetween at the corner portion between the upper portion and the outer peripheral wall thereof.

A small hole which communicates with a contact gap between the valve body retainer plate and the valve body is provided on the upper portion of the valve body retainer plate.

The space below the separation plate of the inner cap defines the anti-leakage assembly receptacle to be closed by an inner cap cover. In the normal position of the filler neck cap during usage as shown FIG. 1, a cut-off valve is elastically supported by a closure spring when a weight ball occupies a home position so that the cut-off valve is located below the communication hole of the separation plate to open the hole. When the weight ball releases a cut-off valve lever owing to overturning the filler neck cap in an eventual accident, the cut-off valve closes the communication hole by the spring return motion. As being well known, since the receptacle for the anti-leakage assembly has large dimensions, a big weight ball is employed.

The filler neck cap is preferably made of a plastic material having high weather-proof and oil resistance. For example, polyamide resin is suitable for the outer cap and polyacetal resin is suitable for the inner cap and the valve body retainer plate. Because appropriate solidity and elasticity are required for the valve body, oil-resistant rubber is utilized for the same.

A function of the filler neck cap constructed in the above-mentioned manner according to the present invention will be explained below.

Since the valve body retainer plate is in a hat-like configuration, an outer coil spring is accommodated at the outermost periphery along the inner wall of the inner cap, and all of the valve body, the negative pressure valve body and an inner coil spring can be compactly contained within the valve body retainer plate at the lower side thereof. In case of the filler neck cap including the positive pressure valve alone, only the valve body is left and the negative pressure valve body may be omitted. The hat-like configuration of the valve body retainer plate is preferable from the point of strength, and even if the valve body retainer plate is thin in thickness, sufficient strength can be achieved thanks to the hat-like configuration. The upper and lower ridges of the valve body allow the valve body to favorably contact with a valve seat to which the valve body opposes, and also prevent the valve body and the valve seat from sticking to each other, thereby reducing opening resistance by a sticking phenomenon between the valve body and the valve seat, as well as increasing a sealability of the valve.

The wall holes disposed on the valve body retainer plate functionally decrease a granting noise during passage of the fluid and ensure a stable flow of the fluid passing through the valve.

The small hole of the valve body retainer plate serves to expel gas even when the contact gap between the valve body retainer plate and the valve body is small in size, so that both of them do not stick together and the opening/closing function of the valve is favorably maintained.

Because the positive-negative pressure valves are compactly accommodated in the valve body retainer plate, the anti-leakage assembly receptacle at the lower portion of the positive-negative pressure valves is enlarged in size. As a result, since the big weight ball can be employed, the force of the closure spring is increased, thereby operating the cut-off valve securely upon an accident of overturning the filler neck cap.

The above and other objects, features and advantages of the present invention will become more apparent from the following description when taking in conjunction with the accompanying drawings in which preferred embodiments of the present invention are shown by way of illustrative examples.

BRIEF DESCRIPTION OF THE DRAWINGS

FIGS. 3 and 4 are vertical cross-sectional views of a positive-negative pressure valve portion, wherein FIG. 3 shows a state that a positive pressure valve of FIG. 1 is opened and FIG. 4 similarly shows a state that a negative pressure valve of FIG. 1 is opened;

DETAILED DESCRIPTION OF THE PREFERRED EMBODIMENTS

Preferred embodiments of the present invention will be described in detail hereinafter with reference to the accompanying drawings.

Figure 1:
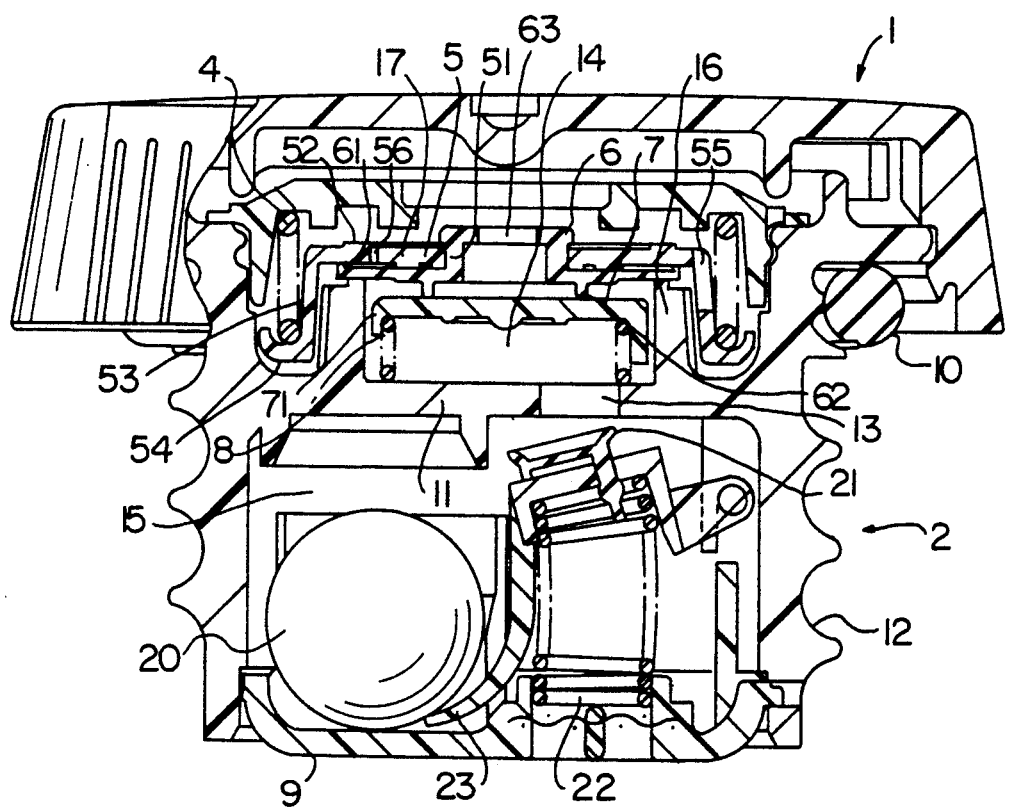
FIG. 1 is a vertical cross-sectional view of a filler neck cap of the positive-negative pressure valve type according to the present invention.

As shown in FIG. 1, a filler neck cap of the positive-negative pressure valve type includes an outer cap 1 and an inner cap 2 provided with a screw portion 12 on its outer periphery. A partition or separation plate 11 having a communication hole 13 is disposed at the intermediate portion within the inner cap, for separating the interior of the inner cap into an upper and lower spaces. The upper half of the inner cap serves as a receptacle 14 for a pressure control valve, and the lower half similarly serves as a receptacle 15 for an anti-leakage assembly.

Figure 4:
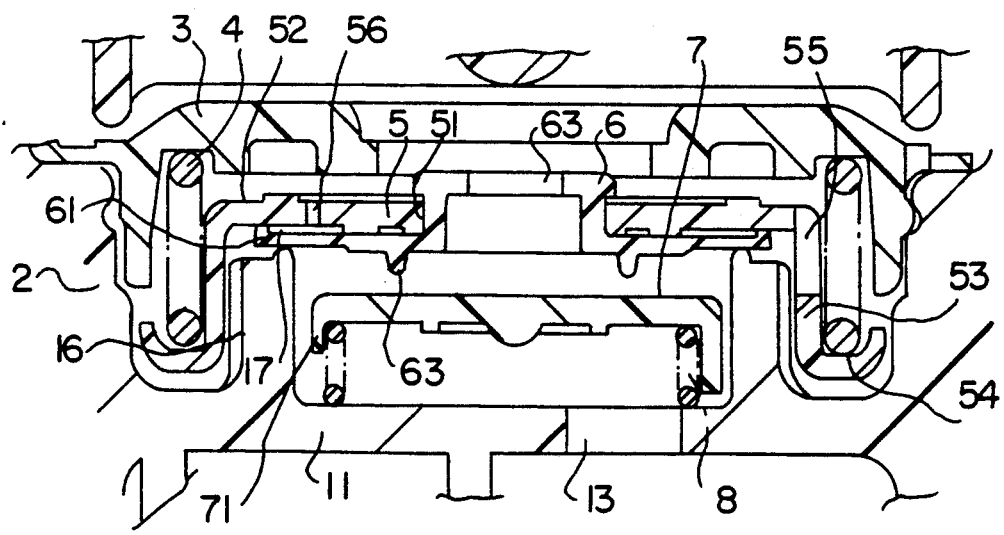
Figure 5:
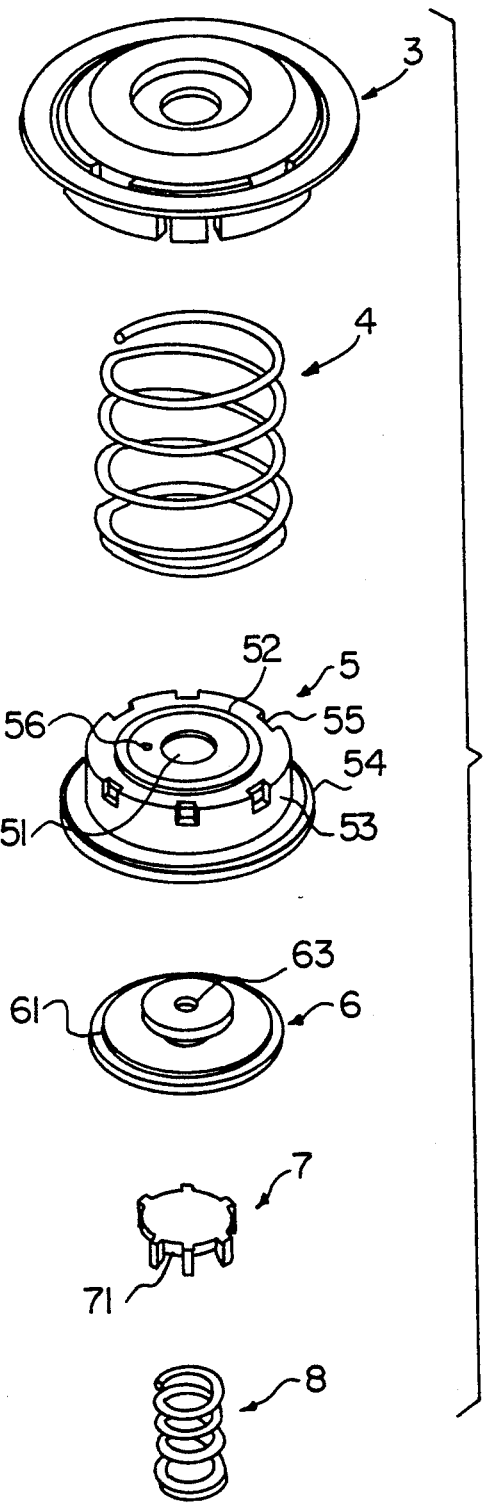
FIG. 5 is an exploded perspective view, illustrating components of the valve body.
Figure 6:
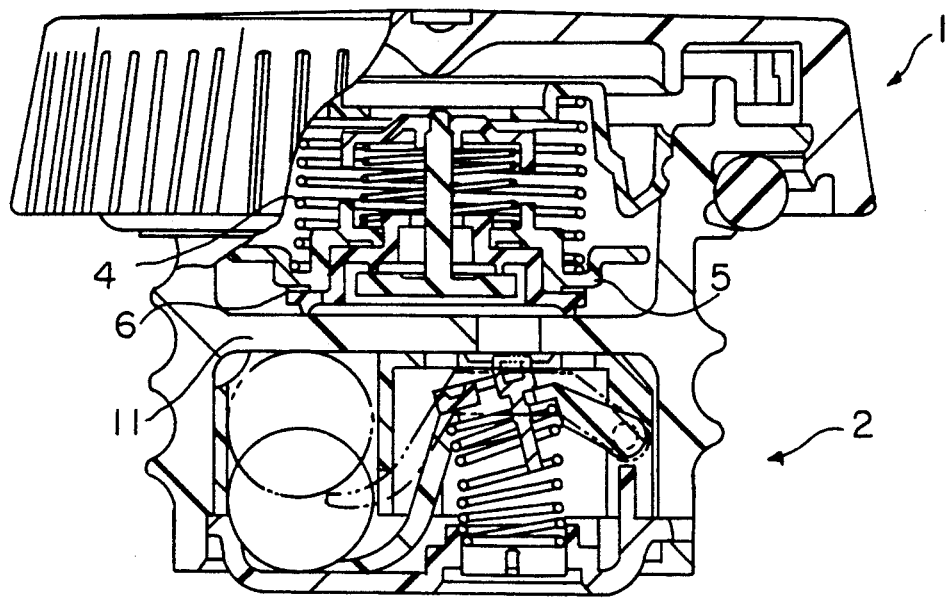
FIG. 6 is a vertical cross-sectional view of a filler neck cap of the positive-negative pressure valve type in the prior art.
Figure 7:
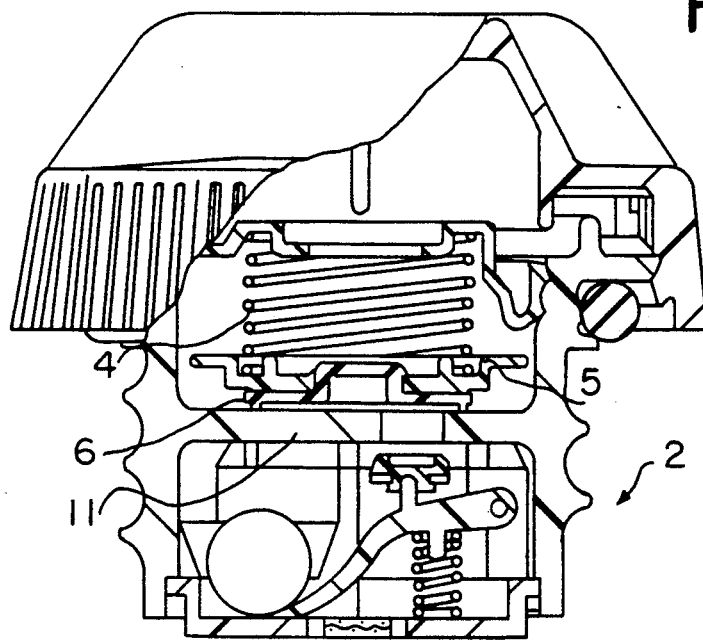
FIG. 7 is a vertical cross-sectional view of a filler neck cap of the positive pressure valve type similar to FIG. 6.

The pressure control valve includes a valve body retainer plate 5, a valve body 6 and a negative pressure valve body 7. An assembled state and an operating manner of these components are clearly understandable from FIGS. 3 and 4, and the details of the respective components are shown in FIG. 5. The valve body retainer plate 5 is formed into a hat-like configuration, which is formed with an upper portion 52 having a passing hole 51 at its center, an outer peripheral wall 53 and a spring reception tongue portion 54. The valve body 6 is in engagement with the valve body retainer plate 5 whose passing hole 51 sustains a portion of the valve body 6. This portion of the valve body 6 extends through the passing hole 51 of the valve body retainer plate 5, forming at the protruded upper end with a smaller disk. The valve body 6 also includes at the bottom end a lower larger disk having on the upside a peripheral upper ridge 61 and on the downside a lower ridge 62 whose diameter is smaller than that of the upper ridge, and further includes a center communication opening 63. As a result, the appearance of the valve body 6 represents a double-disk member with the lower larger and upper smaller disks. The diameter of the negative pressure valve body 7 is predetermined larger than the extension of the lower ridge 62 on the bottom of the valve body 6, forming a pan-like shape setting the opening side down. The negative pressure valve body is provided at the periphery with a skirt portion 71 extending downwardly. The negative pressure valve body 7 is accommodated in a valve body reception circular casing 16 extending upwardly from the separation plate 11 of the inner cap 2, while being compressed at the upper face thereof against the lower ridge 62 of valve body 6 by means of an inner coil spring 8.

Figure 2:
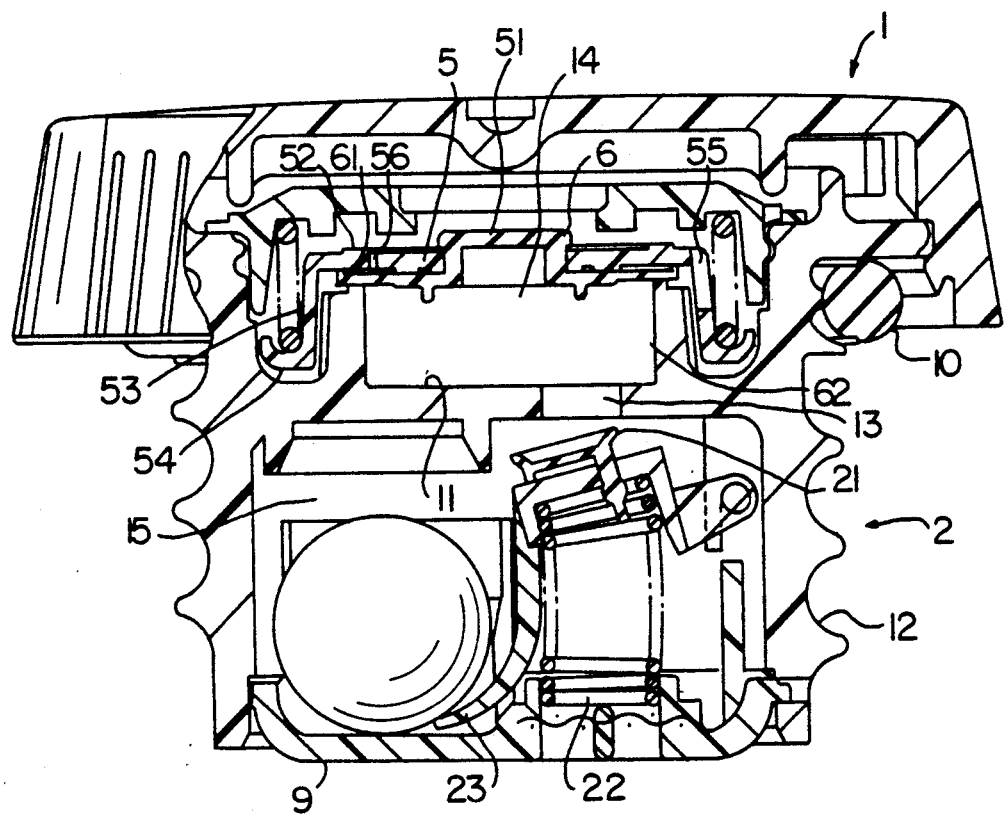
FIG. 2 is a vertical cross-sectional view of a filler neck cap of the positive pressure valve type according to the invention.

As be clearly seen from FIGS. 1 and 2, when these valve bodies are incorporated into the pressure control valve receptacle 14, the filler neck cap is arranged in such a manner that the side wall and the spring reception tongue of the valve body retainer plate 5 is received within the space between the inner wall surface of the inner cap 2 and the outer surface of the valve body reception circular casing 16 so as to dispose the valve body 6 interposing between the bottom surface of the upper portion of the retainer plate 5 and the distal end portion of the circular casing 16, causing the retainer plate 5 to overlap the valve body 6. Subsequently, the outer coil spring 4 is mounted on the spring reception tongue 54 before a compression plate 3 is securely fitted by snap action from the upper side at the top within the inner cap 2. Particularly, the smaller disk plate of the valve body 6 through which the communication opening 63 extends is fitted within the passing hole 51 of the valve body retainer plate 5, both the retainer plate 5 and the valve body 6 being integrally connected and being movable together.

The space below the separation plate 11 of the inner cap 2 defines the anti-leakage assembly receptacle 15 to be closed by an inner cap cover 9. In the normal position of the filler neck cap during usage as shown in FIG. 1, a cut-off valve 21 is elastically supported by a closure spring 22 when a weight ball 20 occupies a home position, and the cut-off valve 21 is thus located below the communication hole 13 of the separation plate 11 to open the hole. When the weight ball 20 releases a cut-off valve lever 23, owing to overturning the filler neck cap in an eventual accident, the cut-off valve 21 closes the communication hole 13 by the spring return motion. In the illustrated embodiment, the elongated cut-off valve lever 23 is at one end pivotally connected to the wall of the inner cap, withstanding the force of the closure spring 22. The cut-off valve 21 is supported in the vicinity of the intermediate portion of the cut-off valve lever 23. The closure spring 22 is interposed between the cut-off valve lever 23 and the inner cap cover 9. The other end of the cut-off valve lever 23 is located below the rollable weight ball 20 in the anti-leakage assembly receptacle 15 of the inner cap 2.

As mentioned above, upon completion of assembling the respective components and finishing these components into the pressure control valve and the anti-leakage assembly within the pressure control valve receptacle 14 and the anti-leakage assembly receptacle 15, the outer cap 1 is fitted and secured to the upper face of the inner cap 2. Succeedingly, an O-ring seal 10 is attached on the uppermost outer periphery of the screw portion 12 of the inner cap 2, thereby obtaining a finished product of the filler neck cap.

Referring to FIG. 2, there is illustrated an alternative of a positive pressure valve type filler neck cap. It can clearly be recognized in comparison with respect to FIG. 1 that the filler neck cap of FIG. 2 is characterized in that both a negative pressure valve body 7 and an inner coil spring 8 as a supporter for the same are omitted, and that there is no communication opening 63 in a valve body 6. The filler neck cap serves to expel pressure in a fuel tank (not shown) to the outside when the pressure in the tank becomes positive. The filler neck cap having the structure as mentioned above is advantageous in that all components except the valve body 6 are compatible in both types of the positive-negative pressure valves and the positive pressure valve. A manufacturer can readily assemble a necessary type valve, if only the valve body 6 is exchanged for a new one for the positive pressure valve type.

Figure 3:
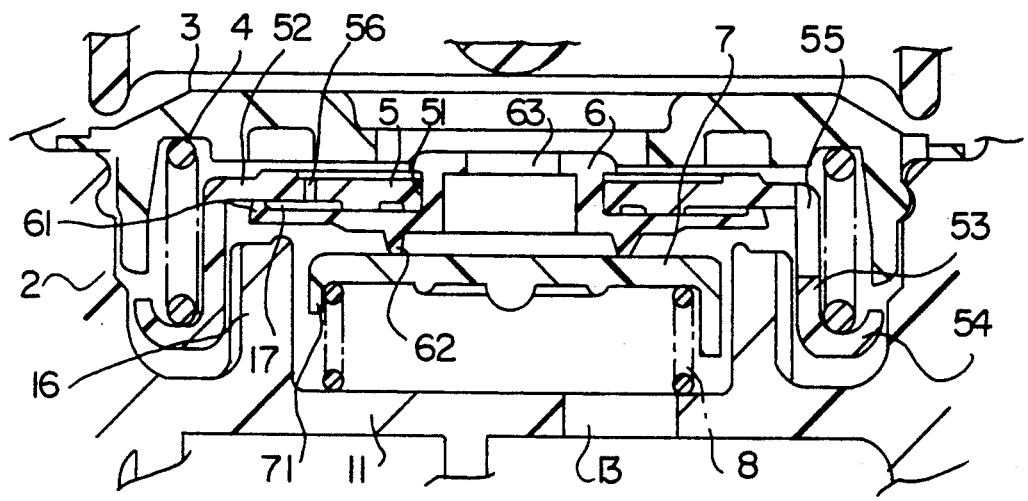

Further, if the pressure in the fuel tank becomes positive, the positive-negative valve bodies are displaced to a position as shown in FIG. 3. Wall holes 55 provided at the corner portion of the outer peripheral wall 53 of the valve body retainer plate 5 prevent a rapid flow of gas which otherwise causes a granting noise when the valve body 6 is forced to move upward together with the negative pressure valve body 7 thanks to the positive pressure in the tank.

A small hole 56 provided on the upper portion 52 of the valve body retainer plate 5 prevents the valve body 6 from being brought into closed contact with the lower face of the valve body retainer plate 5 and from being decreased in a sealing effect between them by repetition of the positive and negative pressure in the tank. FIG. 4 illustrates a condition of the pressure control valve when the pressure in the tank becomes negative. The negative pressure valve body 7 is moved downwardly apart from the valve body 6 which is sealingly engaged with a valve body reception circular casing 16 of the inner cap 2. In the above case, when a magnitude of the negative pressure in the tank is further increased, there exists no contact gap 17 between the valve body retainer plate 5 and the valve body 6 so that both of them stick together. As a result, elasticity of the valve body 6 is lost, thereby deteriorating the sealing effect of the valve body. The small hole 56 for introduction of air into the contact gap is thus provided in order to prevent the valve body from losing its sealing effect.

Since the filler neck cap according to the present invention is constructed in the above-described manner, the respective components of the cap can be assembled in compact within the restricted space of the cap. The whole cap is increased in mechanical strength. Accordingly, the present invention provides an improved safety filler neck cap having a sufficient reliability in function and satisfactory responsibility to prevent fuel leakage in case of a possible accident or an emergency stop of the running vehicle.

As a result of delicate observation and examination concerning the configurations of the valve body retainer plate and the valve body, it is realized to improve the sealing effect of the valve body under the low pressure condition, to prevent deterioration of the sealing effect caused by sticking of the valve body to the valve body retainer plate, and to prevent occurrence of a sound such as the granting noise.

What is claimed is:

1. A filler neck cap with a pressure valve including an outer cap and an inner cap, said inner cap being provided with a screw portion on its outer periphery and a partition or separation plate with a communication hole at the intermediate portion therewithin, to separate the interior of the inner cap into an upper and lower spaces respectively serving as a receptacle for a pressure control valve and as a receptacle for an anti-leakage assembly, wherein: said pressure control valve is of a positive-negative pressure valve type which comprises a valve body, a valve body retainer plate, and a negative pressure valve body; said valve body retainer plate is formed into a hat-like configuration including an upper portion with a passing hole at its center, an outer peripheral wall and a spring reception tongue; said valve body is in engagement with the valve body retainer plate whose passing hole sustains a portion of the valve body; the valve body presents a double-disk shape with a smaller upper disk and a larger lower disk having on the upside a peripheral upper ridge and on the downside a lower ridge inside the upper ridge, and further having a center communication opening extending through both the disks; the diameter of said negative pressure valve body is predetermined larger than the extension of the lower ridge on the bottom of the valve body, forming a pan-like shape setting the opening side down with a skirt portion extending downwardly on the periphery; and the negative valve body is accommodated in a valve body reception circular casing extending upwardly from the separation plate of the inner cap, while being compressed at the upper face thereof against the lower ridge of the valve body by means of an inner coil spring.

2. A filler neck cap with a pressure valve including an outer cap and an inner cap, said inner cap being provided with a screw portion on its outer periphery and a partition or separation plate with a communication hole at the intermediate portion therewithin, to separate the interior of the inner cap into an upper and lower spaces respectively serving as a receptacle for a pressure control valve and as a receptacle for an anti-leakage assembly, wherein: said pressure control valve is of a positive pressure valve which comprises a valve body and a valve body retainer plate; said valve body retainer plate is formed into a hat-like configuration including an upper portion with a passing hole at its center, an outer peripheral wall and a spring reception tongue; said valve body is in engagement with the valve body retainer plate whose passing hole sustains a portion of the valve body; and the valve body presents a double-disk shape with a smaller upper disk and a larger lower disk having on the upside a peripheral upper ridge and on the downside a lower ridge inside the upper ridge, and further a center communication opening extending through both the disks.

3. A filler neck cap with a pressure valve according to claim 1 or 2, wherein wall holes having predetermined spaced intervals therebetween are provided at the corner portion between the upper portion and the outer peripheral wall of the valve body retainer plate.

4. A filler neck cap with a pressure valve according to claim 1 or 2, wherein a small hole which communicates with a contact gap between the valve body retainer plate and the valve body is provided on the upper portion of the valve body retainer plate.

* * * * *